United States Patent [19]

Flanagan

[11] Patent Number: 4,979,623
[45] Date of Patent: Dec. 25, 1990

[54] COMBINED TOOL FOR RETRIEVING BURIED OBJECTS

[76] Inventor: Michael P. Flanagan, R.D. #6, Fairhill Ave., Pleasantville, N.J. 08232

[21] Appl. No.: 421,014

[22] Filed: Oct. 13, 1989

[51] Int. Cl.$^5$ ............................ B07B 1/02; B25F 1/00
[52] U.S. Cl. ...................................... 209/419; 7/116; 294/51
[58] Field of Search .................... 7/116, 114; 209/417, 209/418, 419; 294/49, 55, 51; 171/43

[56] References Cited

U.S. PATENT DOCUMENTS

| | | | |
|---|---|---|---|
| 1,341,874 | 6/1920 | Bandini | 209/419 |
| 1,409,572 | 3/1922 | Quinn | 209/419 |
| 1,570,191 | 1/1926 | Wyrembek | 294/49 |
| 1,776,596 | 9/1930 | Pforsich | 294/49 |
| 2,960,230 | 11/1960 | Fracker | 294/49 |
| 3,222,699 | 12/1965 | Zeisig | 7/116 |
| 3,851,763 | 12/1974 | Ball et al. | 209/419 |
| 3,976,564 | 8/1976 | Holden | 209/417 |
| 4,653,790 | 3/1987 | Kenney | 294/51 |
| 4,790,585 | 12/1988 | Vernon et al. | 294/51 |
| 4,828,690 | 5/1989 | Montez | 209/418 |

*Primary Examiner*—Roscoe V. Parker
*Attorney, Agent, or Firm*—Dennis H. Lambert

[57] ABSTRACT

A combined tool for retrieving buried objects comprises an elongate handle having a first digging tool at one end and a second digging tool at the other end, one of said digging tools comprising a digging implement for digging in compacted material, and the other digging tool comprising a sifting implement for sifting loosened material to separate objects buried therein. The handle may be folded to make the tool more compact for storage or carrying, and a comb or toothed device may be attached to the sifting element to facilitate use of the tool in material containing stones, seashells, or the like, or in wet sand or the like.

7 Claims, 3 Drawing Sheets

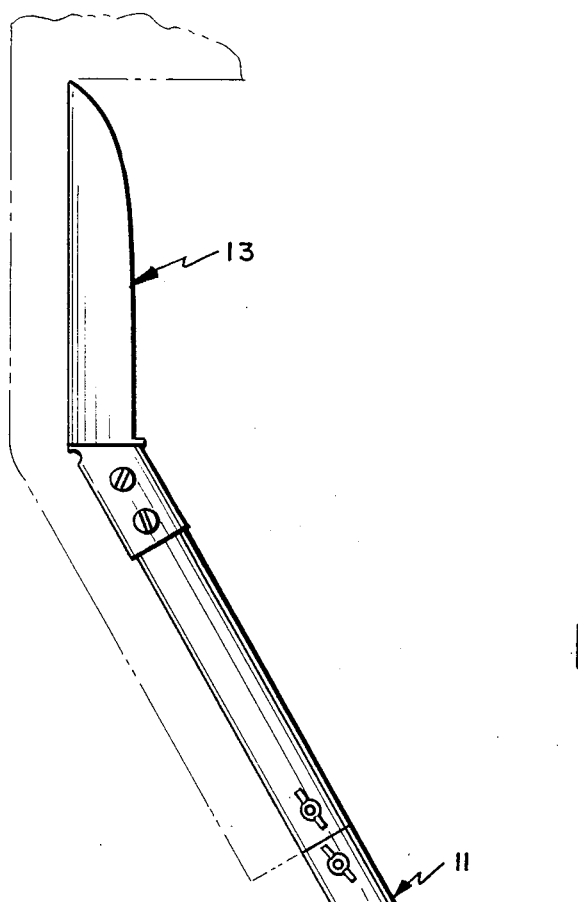
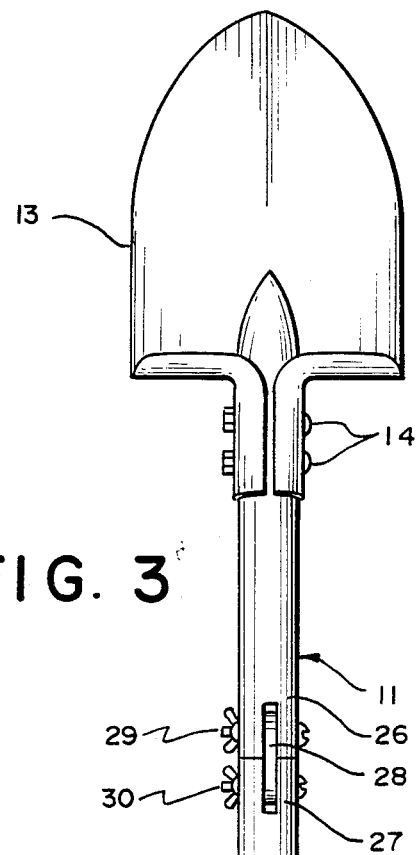
FIG. 3
FIG. 2

U.S. Patent  Dec. 25, 1990  Sheet 3 of 3  4,979,623
FIG. 4
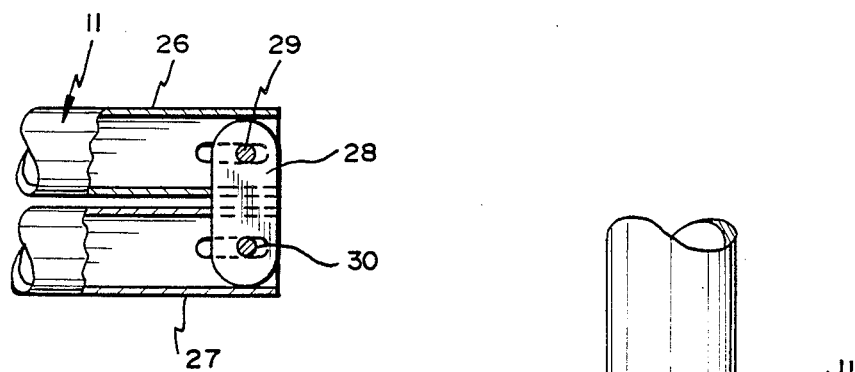
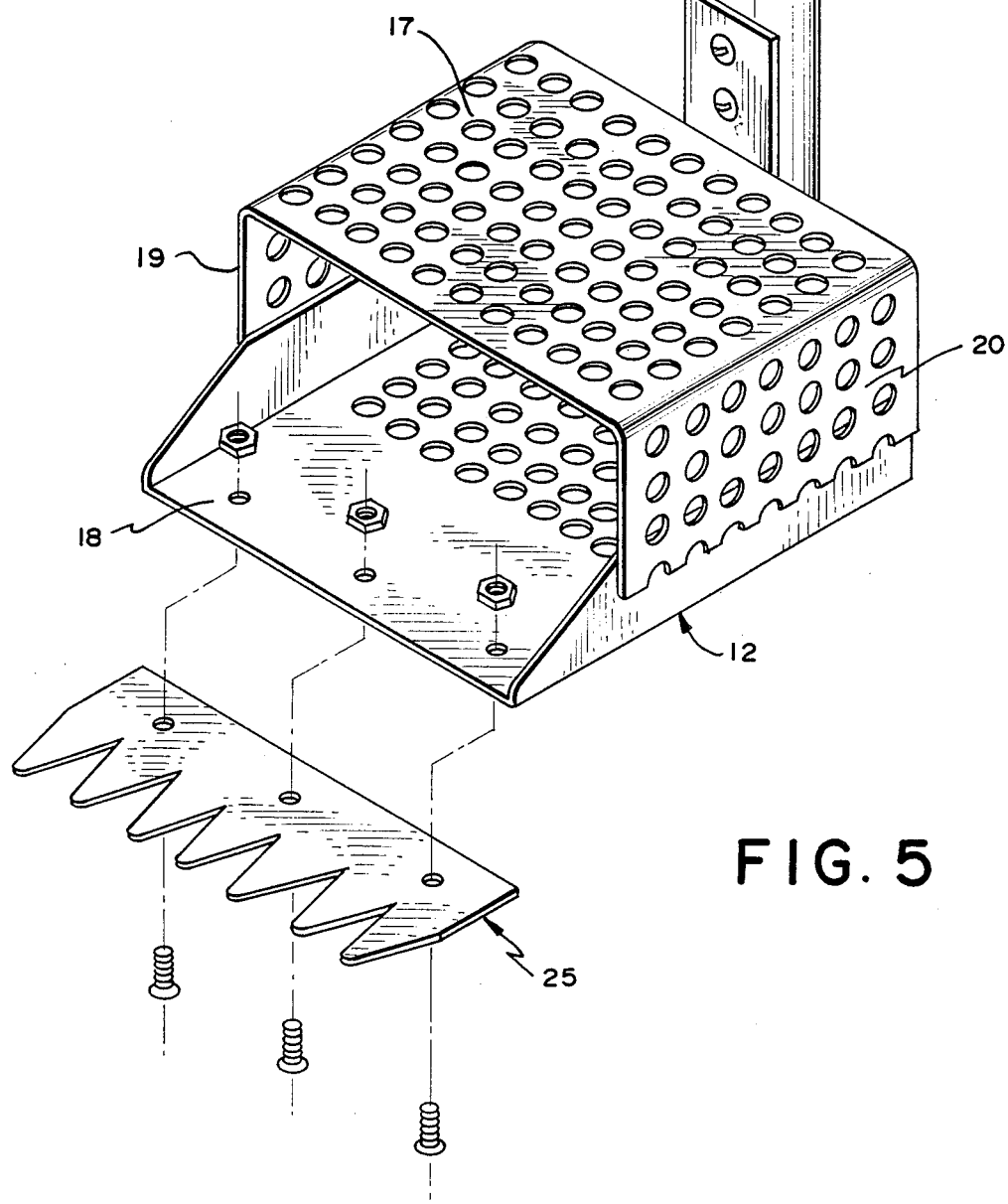
FIG. 5

COMBINED TOOL FOR RETRIEVING BURIED OBJECTS

FIELD OF THE INVENTION

This invention relates generally to apparatus for digging in the earth, and more specifically, to a tool for use by treasure seekers and those who dig in the earth to locate buried treasure, such as coins, jewelry, and other artifacts.

BACKGROUND OF THE INVENTION

A variety of objects lie buried just beneath the surface of the earth, including coins, jewelry and other artifacts of monetary and/or sentimental value. Such objects are commonly lost at beach areas, for example.

Various equipment has been devised to locate and retrieve such objects. For instance, metal detectors make it possible to quickly and easily locate the buried objects, which may then be retrieved by any suitable means. Prior art devices used for this purpose typically include a variety of tools, including spades, shovels, sieves and the like. At present, the treasure hunter must carry all of these tools as separate items. Moreover, these prior art tools have generally been developed for another purpose and they are not entirely satisfactory for treasure hunting. For instance, with the tools available in the prior art, considerable bending and stooping must be performed in order to retrieve the buried objects. Further, sieves and the like are usually not strong enough nor designed to be dragged through loose soil, especially wet sand, whereby the sand will filter through the sieve, leaving the artifacts behind. Even when this result is accomplished, many sieves are not properly dimensioned to permit the treasure hunter to easily gain access to the interior of the sieve for retrieving recovered objects.

Moreover, since treasure hunters typically spend many hours and walk great distances while seeking buried treasure, it is important that the tools used are lightweight and compact. Prior art tools are generally not designed with this in mind.

SUMMARY OF THE INVENTION

Accordingly, it is an object of the invention to provide a lightweight and compact tool for retrieving buried treasure.

Another object of the invention is to provide a combined tool for retrieving objects from beneath the surface of the earth, wherein multiple tools are provided in a single unit for selective use.

A further object of the invention is to provide a lightweight and compact tool for retrieving objects buried in the earth, without necessitating bending or stooping to recover the objects.

A still further object of the invention is to provide a combined tool for retrieving objects buried in the earth, in which first and second digging tools are provided at opposite ends of a single handle, with each tool capable of functioning to facilitate use of the other, thereby providing a cooperative interrelationship between the multiple tools.

Yet another object of the invention is to provide a combined tool for retrieving buried treasure, in which a shovel or spade is provided at one end of a handle and a scoop sieve is provided at the other end, whereby the shovel end may be used to loosen compacted soil and/or for retrieving deeply buried objects, and the scoop sieve end may be dragged through loose soil or sand or the like so that the soil will filter through the sieve while the object being sought remains in the scoop sieve.

An even further object of the invention is to provide a tool for retrieving buried treasure, in which a scoop sieve is designed to readily accommodate the hand of the user so that recovered objects may be easily retrieved from the scoop sieve.

Yet another object is to provide a scoop sieve for retrieving buried objects, in which teeth are provided on the scoop sieve for loosening compacted soil, wet sand, etc. to facilitate use of the scoop sieve.

Another object of the invention is to provide a combined tool having different tools at opposite ends of a single handle for retrieving buried objects, and in which the handle is collapsible by folding or telescoping to render it more compact in size for storage or carrying.

These objects of the invention are accomplished by a combined tool having an elongate handle with a different digging tool at each of its ends. In a preferred form, one of the digging tools comprises a spade or shovel blade and the other tool comprises a scoop sieve. The scoop sieve is configured and dimensioned so as to easily accommodate the hand of the user for retrieving objects recovered by use of the tool, and the handle is configured to facilitate positioning of the scoop sieve for proper relationship to the earth during use, i.e., in a position to be properly dragged through the soil without requiring bending or other special effort on the part of the user. The shovel end is designed and positioned relative to the scoop sieve end so that it provides a stabilizing surface for contact with the arm of the user when the scoop sieve is being used.

The tools at both ends of the handle are removable for replacement and/or repair, and a comb or toothed unit is removably attached to the front of the scoop sieve to facilitate use of the sieve in compacted soil or wet sand and the like. Further, the handle is collapsible by telescoping or folding action to make it more compact for storage or carrying, and the tool is made of a sturdy, lightweight material such as aluminum, for example. When thus constructed, the tool is capable of use in either fresh water or salt water environments.

BRIEF DESCRIPTION OF THE DRAWINGS

The foregoing and other objects and advantages of the invention will become apparent from the following detailed description when considered in conjunction with the accompanying drawings, in which like reference characters designate like parts throughout the several views, and wherein:

FIG. 2 is a side view in elevation of the combined tool of the invention;

FIG. 3 is a front view of the tool, looking into the open end of the scoop sieve;

FIG. 4 is an enlarged, fragmentary, partly sectional view of one possible structure which may be employed to make the handle collapsible; and FIG. 5 is a greatly enlarged, fragmentary perspective exploded view of the scoop sieve and removable comb or toothed unit.

DETAILED DESCRIPTION OF THE PREFERRED EMBODIMENTS

Figure 1:
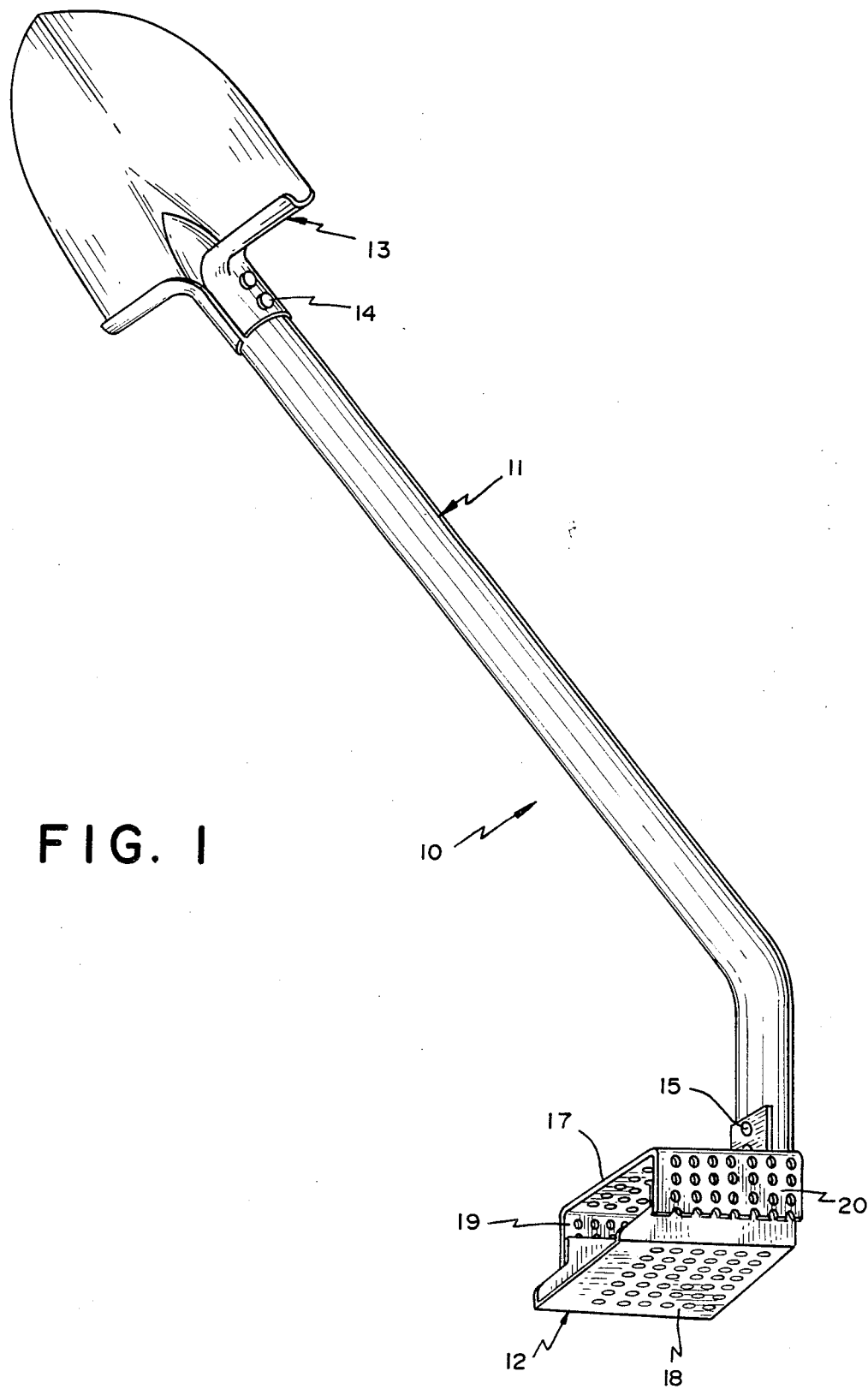
FIG. 1 is a perspective view of the combined tool of the invention.

Referring more particularly to the drawings, a combined tool in accordance with the invention is shown generally at 10 in FIGS. 1–3. The combined tool comprises an elongate handle 11, bent at an acute angle "A" near one end thereof, with a first digging tool, such as scoop sieve 12 on said one end, and a second digging tool, such as a shovel or spade 13 on the other end. Both the scoop sieve and the shovel are removably attached to the handle by suitable fasteners 14 and 15, respectively. In a preferred construction, the handle comprises a length of aluminum tubing.

As seen best in FIGS. 1 and 2, the scoop sieve 12 is secured on the inside portion of the bent end of the handle and projects at approximately a right angle thereto. Further, each end of the handle is reinforced with a wooden plug 16 inserted into the open end of the handle where the respective tools attach. Only one plug is shown, but it is to be understood that a similar plug is provided at both ends of the handle.

The scoop sieve 12 is essentially rectangular in configuration, having a perforated top 17, bottom 18 and opposite sides 19 and 20. It is sized to accommodate the hand of the user so that any object contained therein can be easily recovered. In use, the handle is grasped and the scoop sieve is drawn through the sand, loose soil or other material being searched, to scoop up the material and any objects contained therein. The soil sifts through the perforations, leaving the object(s) in the scoop sieve. The bend in the handle is selected so that the scoop sieve will be properly positioned for being dragged or drawn through the loose soil, etc., without requiring the user to bend or stoop. In a preferred construction, the scoop sieve is made of an aluminum alloy.

The shovel 13 at the other end of the handle is designed so that the flat part thereof serves as a stabilizing surface for engagement with the arm of the user while the scoop sieve is being drawn through loose soil, and the base of the shovel may be grasped to facilitate manipulation of the scoop sieve. However, the primary purpose of the shovel is for digging up objects that are more deeply buried, and for loosening compacted soil, etc. After a buried object has been loosened, the tool may be inverted end-for-end and the scoop sieve used to recover the object. The shovel is preferably made of steel, although other materials may be used, if desired.

The use of aluminum for the handle and scoop sieve not only makes the tool lightweight, but also enables the tool to be used in salt water environments.

In some instances, such as when a large number of stones are encountered in the soil, or a large number of seashells are present, or in wet sand, the scoop sieve shown in FIGS. 1–3 may be difficult to use. In such instances, a removable comb or toothed device 25 may be attached to the front edge of the scoop sieve to aid in loosening the soil. In practice, it has been found that teeth having a length of approximately one inch work well.

As seen in FIGS. 2, 3 and 4, the handle may be made collapsible to make the tool more compact for storage or carrying. One type of collapsible handle is the folding structure shown in these figures. Adjacent end portions 26 and 27 of the handle at a point near the middle are slit and a link 28 is pivoted in the slit end portions. Fasteners 29 and 30 are then passed through aligned openings to retain the handle in its extended position as shown in FIGS. 2 and 3, or a collapsed, folded position indicated in dot-and-dash lines in FIGS. 2. Also, see FIG. 4. It should be noted that when the tool is folded the handle portions extend closely parallel to one another and the shovel lies in closely spaced, parallel relationship to the bent end portion, with the scoop sieve extending past the end of the shovel.

A combined tool in accordance with the invention has an overall length of about 45 inches, and the dimensions and angular relationships of the shovel and scoop sieve may be altered to suit various individuals.

Although the invention has been described with reference to particular embodiments, it is to be understood that these embodiment are merely illustrative of the application of the principles of the invention. Numerous modifications may be made therein and other arrangements may be devised without departing from the spirit and scope of the invention.

I claim:

1. A combined tool for retrieving buried objects, comprising:
    an elongate handle having first and second ends, said second end extending at an angle relative to the first end;
    a blade-like digging tool fixed on said first end for digging in compacted material, to loosen and move the material, while said angularly disposed second end functions as a handle to facilitate manipulation of the digging tool; and
    a scoop-shaped sifting implement fixed on said second end of the handle for movement through loose material to scoop up the loose material and any objects buried therein, with the loose material being sifted through the sifting implement and the buried objects remaining therein, said sifting implement extending from the axis of the second end at an angle so that the sifting implement will extend substantially parallel to the surface of the ground when the first end of the handle is grasped and the sifting implement is dragged or pulled through the loose material to scoop up the buried objects, the angle of the first end relative to the second end of the handle, and the orientation, shape and size of the digging tool and sifting implement being such that each tool can be gripped or contacted with a part of the body of the user during use of the other tool to facilitate manipulation of the other tool.

2. A combined tool as claimed in claim 1, wherein: said digging tool comprises a shovel blade.

3. A combined tool as claimed in one of claims 1 or 2, wherein:
    the sifting implement is of box-like configuration, and has an open front, a top wall, bottom wall, back wall and opposite side walls of perforated material, said sifting implement being fixed to said handle at the back wall thereof, and the walls being spaced from one another to enable the hand of a user to be inserted therein to retrieve objects from the implement.

4. A combined tool as claimed in claim 1, wherein: said handle is collapsible to make the tool more compact for storage and carrying.

5. A combined tool as claimed in claim 4, wherein: said handle is foldable about a pivoted connection between the ends thereof.

6. A combined tool as claimed in claim 1, wherein: the sifting implement has a removable comb or toothed device attached thereto to facilitate use in soil containing stones or seashells, or in wet sand.

7. A combined tool as claimed in claim 1, wherein: the handle and sifting implement are made of a lightweight material.

* * * * *